(12) United States Patent
Gentelet et al.

(10) Patent No.: US 9,105,024 B2
(45) Date of Patent: Aug. 11, 2015

(54) METHOD AND SYSTEM FOR THE AUTOMATED MANAGEMENT OF OBJECTS PROVIDED WITH RFID TAGS

(75) Inventors: Franck Gentelet, Guyancourt (FR); Jean-Clement Bouveresse, Sannois (FR)

(73) Assignee: IER, Suresnes (FR)

( * ) Notice: Subject to any disclaimer, the term of this patent is extended or adjusted under 35 U.S.C. 154(b) by 0 days.

(21) Appl. No.: 13/822,492

(22) PCT Filed: Mar. 7, 2011

(86) PCT No.: PCT/FR2011/050470
§ 371 (c)(1),
(2), (4) Date: Mar. 12, 2013

(87) PCT Pub. No.: WO2012/025676
PCT Pub. Date: Mar. 1, 2012

(65) Prior Publication Data
US 2013/0339221 A1 Dec. 19, 2013

(30) Foreign Application Priority Data
Nov. 2, 2010 (FR) ...................... 10 59021

(51) Int. Cl.
G06Q 40/00 (2012.01)
G06Q 20/32 (2012.01)
G06K 7/00 (2006.01)
G06K 7/10 (2006.01)
G06K 17/00 (2006.01)
G07G 1/00 (2006.01)
G07G 3/00 (2006.01)
G08B 13/24 (2006.01)

(52) U.S. Cl.
CPC .......... *G06Q 20/3278* (2013.01); *G06K 7/0008* (2013.01); *G06K 7/10128* (2013.01); *G06K 17/00* (2013.01); *G07G 1/009* (2013.01); *G07G 3/00* (2013.01); *G06K 2017/0064* (2013.01); *G06K 2017/0067* (2013.01); *G08B 13/2417* (2013.01); *G08B 13/2462* (2013.01)

(58) Field of Classification Search
CPC ....... G06K 19/00; G06Q 30/00; G06Q 20/00; G06Q 10/00; G06Q 40/00
USPC ................................ 705/3–44; 235/380–385
See application file for complete search history.

(56) References Cited

U.S. PATENT DOCUMENTS

| 5,734,327 | A | * | 3/1998 | Batterink et al. .......... 340/572.5 |
| 6,025,780 | A | | 2/2000 | Bowers et al. |
| 7,000,834 | B2 | * | 2/2006 | Hind et al. ..................... 235/385 |
| 8,210,439 | B2 | * | 7/2012 | Kangas et al. ................ 235/493 |

(Continued)

FOREIGN PATENT DOCUMENTS

EP 1688863 8/2006

*Primary Examiner* — Frantzy Poinvil
(74) *Attorney, Agent, or Firm* — Greer, Burns & Crain Ltd.

(57) ABSTRACT

An automated method is provided for managing objects each provided with an RFID tag having at least one item of identification data associated with the object, the method including a step of reading at least one item of identification data stored in at least one RFID tag arranged on at least one object positioned at the reading site, and further including a deactivation of at least one RFID tag the item of identification data of which has been read so that it is not detected during a fraud detection step.

A system implementing such a method is also provided.

17 Claims, 3 Drawing Sheets

(56) References Cited

U.S. PATENT DOCUMENTS

| | | | |
|---|---|---|---|
| 8,487,769 B2* | 7/2013 | Lindsay et al. | 340/572.3 |
| 8,511,555 B2* | 8/2013 | Babcock et al. | 235/385 |
| 8,878,675 B2* | 11/2014 | Tiedmann | 340/572.1 |
| 2003/0168950 A1* | 9/2003 | Fukushima et al. | 312/223.2 |
| 2005/0098621 A1* | 5/2005 | de Sylva | 235/379 |
| 2007/0081671 A1 | 4/2007 | Ross, Jr. et al. | |
| 2008/0094218 A1* | 4/2008 | Kobres | 340/572.3 |
| 2011/0254665 A1* | 10/2011 | Lindsay et al. | 340/10.5 |

* cited by examiner

METHOD AND SYSTEM FOR THE AUTOMATED MANAGEMENT OF OBJECTS PROVIDED WITH RFID TAGS

CROSS-REFERENCE

The present application is a 35 U.S.C. §371 National Stage Entry of, and claims priority to International Application No. PCT/FR2011/050470 filed on Mar. 7, 2011 under 35 U.S.C. §120, which claims the benefit of French Patent Application No. FR 10 59021 filed on Nov. 2, 2010 under 35 U.S.C. §§119(a) and 365(b), all of which are incorporated herein by reference.

BACKGROUND

The present invention relates to an automated method for managing objects provided with RFID tags. It also relates to a system implementing such a method.

The field of the invention is the field of the automated management of objects provided with RFID tags and more particularly the automated collection of payment, i.e. on the purchase/sale of objects provided with RFID tags.

Nowadays RFID tags are commonly used for the identification, tracking and the management of objects. Systems using RFID technology allow more reliable and faster automated management of objects in numerous fields.

The use of the RFID tags goes hand-in-hand with the need to have access to RFID tag reading devices and more particularly to solutions for the management and processing of RFID tags within the context of the sale of articles provided with RFID tags.

RFID tags currently exist for the identification of a product. These RFID tags are used for storing one or more items of data associated with the product on which these RFID tags are arranged.

Certain systems of payment use RFID tags for managing the collection of payment at a supermarket collection terminal or checkout for example and more particularly for making an automatic or semi-automatic payment. These systems comprise means for reading RFID tags, arranged on payment terminals or at the level of a checkout conveyor belt in order to identify each of the products that a customer wishes to purchase and means for consulting a database to determine the price of each of the products identified in order to inform the customer of the sum to be paid. In fully-automated payment systems, the customer is then directed to electronic payment means to settle the amount owed.

However, to limit theft, each of the products bearing an RFID tag also bears an anti-theft device intended to cooperate with detection means to signal the theft of a product when an individual attempts to steal it. This anti-theft device must be deactivated once the product has been legally purchased by a consumer.

Thus, at present the systems for managing products bearing RFID tags comprise on the one hand means for reading an RFID tag and means for detection and for deactivation of an anti-theft device, which makes these systems complex and expensive. Moreover, these systems require an RFID tag and an anti-theft device to be arranged on each product, which represents a not insignificant cost, both in terms of resources but also in terms of labour.

A purpose of the present invention is to remedy the abovementioned drawbacks.

Another purpose of the invention is to propose a less expensive method and system for the automated management of objects provided with RFID tags.

Finally, another purpose of the invention is to propose a less labour-intensive method and system for the management of objects provided with RFID tags.

SUMMARY

The invention proposes to achieve the abovementioned purposes by an automated method for managing objects each provided with an RFID tag comprising at least one item of identification data associated with said object, said method comprising a step of reading at least one item of identification data stored in at least one RFID tag arranged on at least one object positioned at a so-called reading site, characterized in that it also comprises a step of deactivation of at least one RFID tag the item of identification data of which has been read so that it is not detected during a fraud detection step.

The steps of reading and deactivating the tags are generally carried out jointly with the collection of payment for the products with which these tags are associated.

The reading of an item of identification data can be carried out by first reading means comprising for example an RFID antenna and an RFID module comprising for example an RFID reader also called an RFID coupler.

Thus, the method according to the invention uses the same RFID tag both for the identification of the object and for the detection of fraud. In other words, the identification and the detection of fraud are carried out using the same frequency.

The method according to the invention therefore makes it possible to avoid affixing two devices to each object, one for identification and the other to control fraud. As a result, the method according to the invention makes it possible to carry out less expensive management of objects provided with RFID tags.

Moreover, by avoiding the application of an anti-fraud device in addition to the RFID tag, the method according to the invention makes it possible to carry out a management of objects provided with RFID tags which is less labour-intensive and therefore faster.

Moreover, the method according to the invention makes it possible to use the same means for carrying out both the reading and the deactivation of these RFID tags.

It should be noted that the reading step may hereafter be denoted "first reading step".

The method according to the invention can also comprise detection of the presence of at least one object at the reading site.

Advantageously, the deactivation of at least one tag can be a functional deactivation of the RFID tag. Such a deactivation can be carried out in several ways.

In a first version the tag can be deactivated by sending a "kill" type request to the RFID tag which deactivates itself. In this case, the tag will be deactivated for good and it will no longer be possible to use it.

In a second version, it is possible to allocate a BIT of the chip of the RFID tag, for example the EAS (Electronic Article Surveillance) bit. Thus, a first value, for example 1, of this bit can be associated with the fact that the tag is active and, a second value, for example 0, of this bit can be associated with the fact that the tag is deactivated.

In a third version, it is possible to write an item of data in a flag in a memory of the chip of the RFID tag.

In the second and third versions, it is possible to reuse the same RFID tag and optionally the same item of identification data within the context of additional management of the object, for example when the object is offered/re-offered for sale in a new commercial structure, or reintroduced into the initial management, for example when an object is returned to a shop where it was sold. In these cases, it is not necessary to change the RFID tag which can simply be functionally activated. In certain cases, the item or items of identification data can be changed.

The method according to the invention can also comprise a step of detection of at least one RFID tag, the item of identification data of which has not been read. Such a step makes it possible to detect an object deposited at the reading site, the tag of which has not been read. Such a step also makes it possible to detect an object which an individual has omitted to deposit at the reading site intentionally or unintentionally, for example in order to steal the object. This detection step is carried out by fraud detection means which can for example comprise second RFID reading means or means for detecting an active RFID tag.

In other words, the detection of at least one active tag the item of identification data of which has not been read (during the first reading step) comprises:

- in a first embodiment, a step of interrogation of RFID tags and a step of detection of the emission of data by an active RFID tag following the interrogation (when the tag has been deactivated using a "kill" request, for example),
- in a second embodiment, a step of reading an item of data relating to the deactivation of the tag (in particular when a BIT is allocated to the state of the tag or an item of data is entered in a flag of the tag).

The detection can also comprise a second reading step of at least one item of identification data of the active RFID tag, in particular using the second reading means described above, as well as a step to determine whether the item of identification data was read during the first reading step, according to data relating to the tags, stored beforehand, in particular stored in a database, generally following the first step of reading by the first means.

This step can constitute a detection step by itself or can be carried out in addition to the steps described above in the case where the tag has been declared active after these operations.

It should be noted that, within the context of the invention, "store" can mean "enter new data in the memory" or "modify data already entered in the memory".

According to a particular version of the method according to the invention, the detection of at least one unread item of identification data can be carried out by comparing an item of identification data with previously read and stored items of identification data. The comparison step then constitutes at least part of the determination step.

In this case, the fraud detection means comprise second means for reading an item of identification data in an RFID tag which is not deactivated.

In fact, it can occur that an RFID tag, the item of identification data of which has indeed been read by the first reading means has not been deactivated for unknown reasons, even if the product associated with this tag has been correctly read at the reading site and paid for. The fact of detecting an unread RFID tag, in particular by comparison of identification data, makes it possible to avoid false alarms caused by an RFID tag the item of identification data of which has indeed been read by the first reading means but which has not been deactivated, whereas it should have been.

In the latter case, the fraud detection step can also comprise a step of deactivation of an RFID tag which has indeed been read by the first reading means but which has not been deactivated during the deactivation step.

The method according to the invention can also comprise an activation of a means for signalling when an unread tag is detected. Thus, a signal or alarm is transmitted when an unread tag is detected.

Advantageously, the method according to the invention can comprise, for at least one item of identification data read, in particular during the first reading step, a consultation of at least one item of data associated with said item of identification data and stored in a database. This consultation can be carried out during or after the reading of the RFID tags. Thus, it is possible to access data associated with the object bearing the read RFID tag. These data can for example comprise data relating to a price, a weight or a type of object.

The method according to the invention can then comprise a display of these data on a display means in order to verify the consistency of the data, for example in order to verify that the item of identification data read does indeed correspond to an object which is identical to the object bearing the tag.

The method according to the invention can also comprise a step of processing an item of data associated with the object and recorded in a database in order, for example, to determine a price to be settled when the method according to the invention is implemented for the sale of objects.

To this end, the method according to the invention can comprise the calculation of an item of data, for example a price, relating to all of the tags read according to the price data associated with each of the objects in the database and consulted during or after the reading of the RFID tags according to the invention.

The method can also comprise a step of automated payment of the price corresponding to all of the objects.

Thus, the method according to the invention can be implemented for automated checking out, i.e. for the purchase/sale of objects provided with RFID tags and more particularly of coffee capsules.

According to another aspect of the invention, a device is proposed for the automated management of objects each provided with an RFID tag comprising an item of identification data associated with said object, said device comprising means for reading at least one item of identification data stored in at least one RFID tag arranged on at least one object positioned at a so-called reading site, characterized in that said system comprises means arranged for deactivating at least one RFID tag, the item of identification data of which has been read.

All or part of the means for deactivating can be comprised within the reading means.

In a preferred embodiment of the system according to the invention, the reading means are arranged to carry out both the reading of the RFID tags and the deactivation of the tags.

It should be noted that the means for reading the management device may hereafter be denoted "first reading means".

The device according to the invention can also comprise means for consulting, in a database, at least one item of data associated with at least one item of identification data read. These means can comprise means for establishing a wired or wireless connection to a database which can be a local or remote database.

The device according to the invention can also comprise means for determining at least one item of data relating to all of the read tags. Such means can comprise a calculator or a calculation module for processing the data read.

The device according to the invention can also comprise means of automated payment, for example by bank card (contact and contactless), loyalty card, cash or luncheon voucher.

According to another aspect of the invention, a device is proposed for detecting an object in a predetermined zone, the object being provided with an RFID tag comprising at least one item of identification data relating to the object, each tag being likely to have been read by first reading means, in particular of a management device according to the invention, prior to its passage into the predetermined zone, the device being intended to detect the RFID tags the item of identification data of which has not been read. The device comprises second reading means for reading, in the predetermined zone, at least one item of identification data of the RFID tag and means for determining whether the tag has been read by the first reading means, according to data relating to the tags and stored at a predetermined storage location to which the detection device is linked.

The means for determining whether the tag has been read comprise in particular means for comparing the identification data stored at the predetermined location and the item of identification data read by the second reading means.

A subject of the invention is also a system comprising the abovementioned management device and means for detecting an RFID tag not read by the first RFID reading means. These detection means can comprise means for detecting an active RFID tag in a predetermined zone and/or reading means.

The detection means can also comprise or be constituted by the abovementioned detection device.

The means for detecting an unread RFID tag can, in a particular embodiment of the system according to the invention, comprise a portal provided for individuals to pass through and carrying out the detection of unread RFID tags.

In the case where the detection means comprise the abovementioned detection device, the management device generally comprises means for storing data according to the data read by the first reading means, at the predetermined storage location, to which this management device is also linked.

The system according to the invention can also comprise means for signalling the detection of at least one unread tag, more particularly alarm means. These signalling means can be arranged to be activated or controlled by the means for detecting an unread RFID tag.

The system according to the invention can advantageously be used for the automated collection of payment, i.e. on the purchase/sale of objects provided with RFID tags.

BRIEF DESCRIPTION OF THE DRAWINGS

Other advantages and characteristics will become apparent upon examination of the detailed description of an embodiment which is in no way limitative, and the attached drawings in which.

DETAILED DESCRIPTION

In the figures and in the remainder of the description, the components common to several figures retain the same reference numbers.

The examples which are described below relate to automated payment collection in a site such as a shop selling objects each provided with an RFID tag.

Figure 1A:
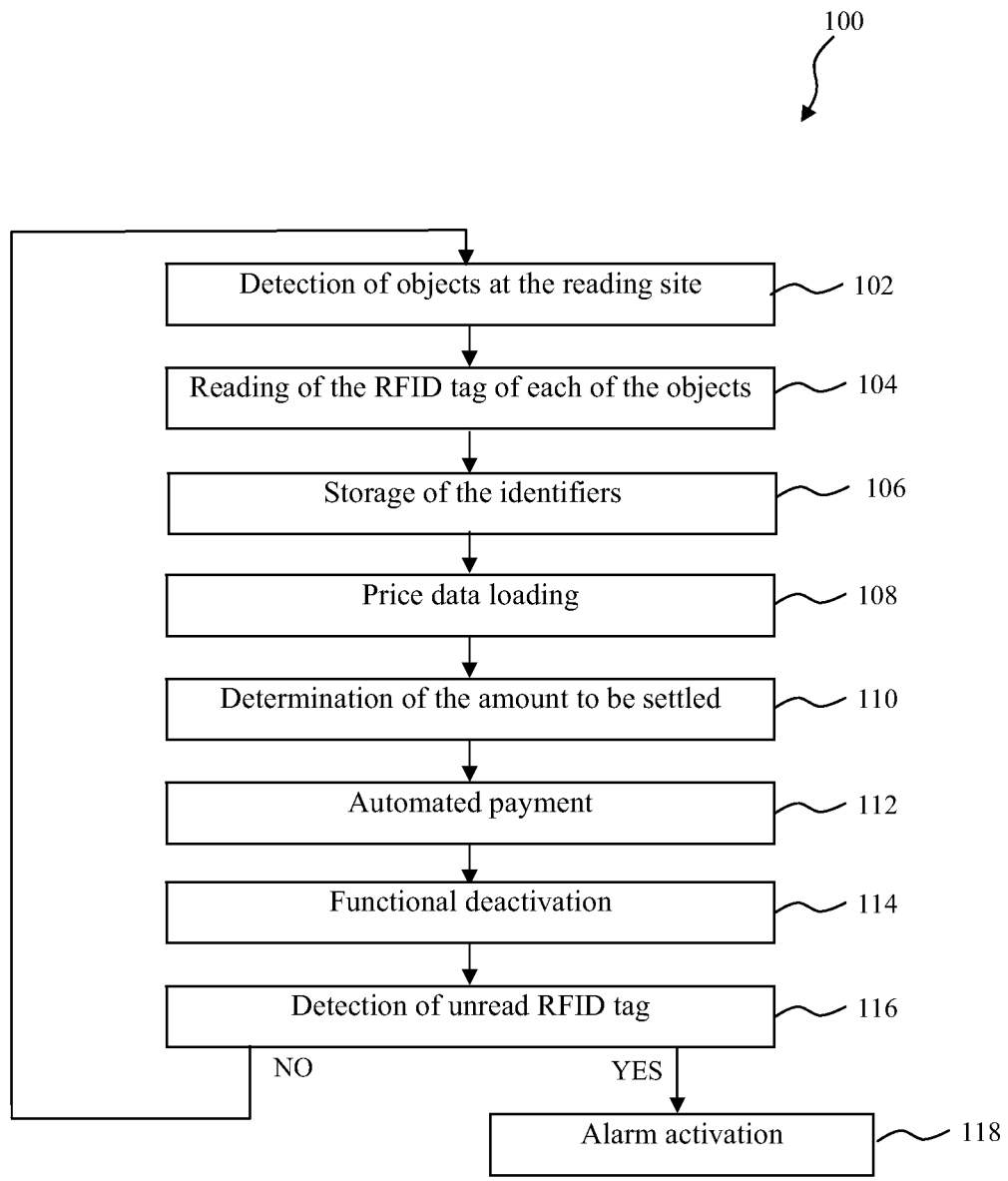
FIGS. 1A and 1B are diagrammatic representations of a method according to the invention.

FIG. 1A is a representation in the form of a flowchart of the steps of a method 100 according to the invention.

This method 100 is implemented in the application described hereafter, in order to facilitate the purchase of products in a shop. For this purpose, each product or object, in particular constituted by a coffee capsule, is provided with an RFID tag comprising at least one item of identification data of the product, for example an identifier of the latter. The RFID tag can also comprise other information relating to the object, etc. It is generally placed on the object before it is supplied to the shop but could be placed on the object once it is already available in the shop.

The method 100 comprises a first step 102 during which presence detection means detect the presence of objects at a reading site. These objects are deposited at the reading site by a consumer wishing to purchase these objects.

During a step 104, a so-called first reading step, for each object present at the reading site, an item of identification data associated with this object is read by first reading means in the RFID tag present on this object. The reading of the RFID tags present on the objects deposited at the reading site is carried out in bulk, i.e. not in any particular order. Several RFID tags can be read at the same time.

Each item of identification data read is recorded in local or remote storage means, in particular in a database stored in these storage means. This storage of the identification data can be carried out either as the reading proceeds, i.e. as soon as a new item of identification data is read from a new RFID tag, or after the reading of all the RFID tags during a step 106 carried out after the first reading step 104. The data can be collected in the same group when they are presented together for reading.

In step 108, for each item of identification data read, an item of price data associated with this item of identification data is loaded from a database. This database can be either a local database which can be accessed on a computing device or a remote database, i.e. accessible from a remote server through a communication network.

This item of price data can also be entered in the memory of the chip of the RFID tag. In this case, the step 108 is not carried out.

During a step 110, an amount to be settled is calculated according to the price data loaded in step 108.

The consumer is invited to settle this amount during a step 112 by automated payment means, for example by bank card.

When the consumer has made the payment, each of the read RFID tags is functionally deactivated. This deactivation can be carried out either as the reading of the RFID tags proceeds, i.e. once a new item of identification data is read from a new RFID tag this RFID tag is deactivated immediately or after the reading of all the RFID tags during a step 114 after the payment step 112. The deactivation of a tag is carried out by sending it a functional deactivation request, for example a "kill" type request.

Then, the consumer removes the objects that he has purchased from the reading site. Having removed these objects, he leaves the checkout or the shop through a portal for the detection of unread RFID tags. When he passes through this portal, a step 116 of detection of unread tags is carried out. The detection of an unread RFID tag makes it possible to detect an article which has not been paid for.

Figure 1B:
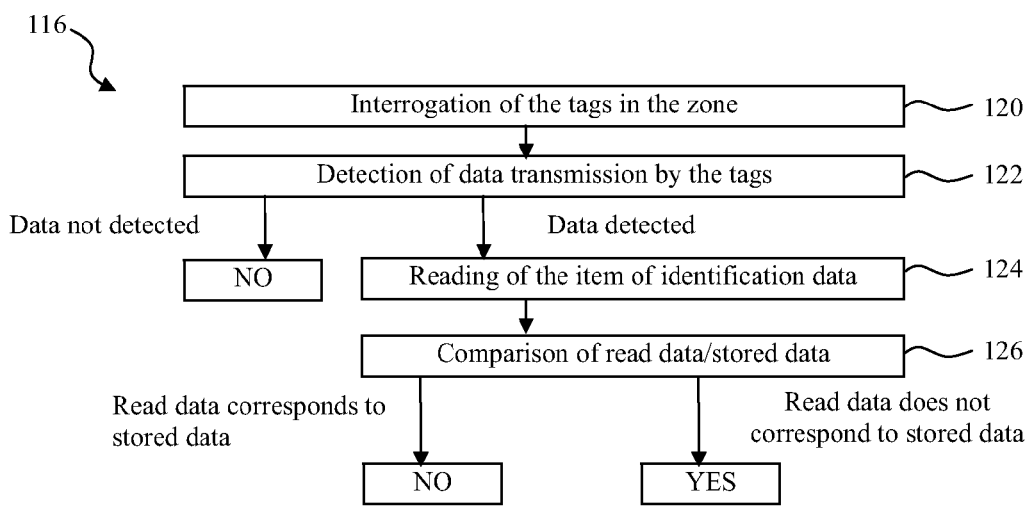

With reference to FIG. 1B, in a first version, the detection step can comprise the following operations:
  interrogation 120 of all the RFID tags, the only tags which can respond (by transmitting data) to this interrogation being those which have not been deactivated during the first reading of the tags, at the time of the collection of payment, detection 122 of the emission of data in response to the interrogation, if an RFID tag is still active then it is considered that this tag has not been read and that the object bearing this tag has not been paid for.

Still with reference to FIG. 1B, in another, more secure, version, this detection can also comprise the following operations, carried out after the operations listed below and for the tags identified as active during these steps:

reading 124 of the identifier of the active RFID tag (denoted second reading step of a means of identification), comparison 126 of the identifiers with the identifiers previously read and stored: if an identifier does not appear among these identifiers then the corresponding RFID tag has not been read and the object bearing this RFID tag has not been paid for.

This version makes it possible to avoid errors due to a non-deactivation of the tags paid for.

When a least one unread RFID tag is detected, signalling means are activated during a step 118 to signal the presence of an unread RFID tag.

In the opposite case a new payment collection cycle is carried out with a new consumer.

Figure 2:
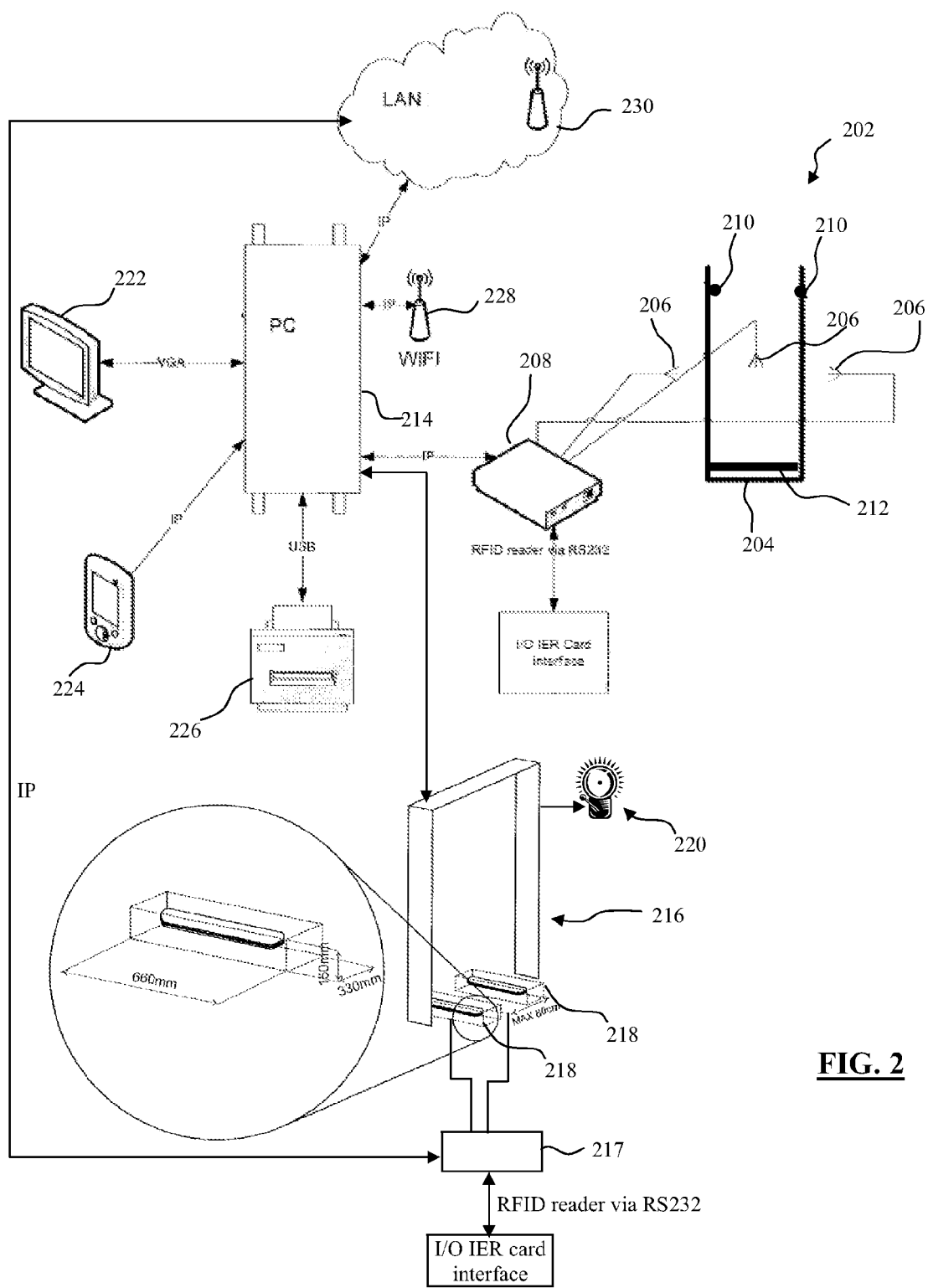
FIG. 2 is a representation of a system according to the invention.

FIG. 2 is a representation of a system according to the invention.

The system 200 represented in FIG. 2 comprises first RFID reading means 202. These first RFID reading means 202 comprise a reading box 204 provided to receive all the objects that the consumer wishes to purchase, several antennas 206 for transmission and reception of radio frequency signals. The antennas 206 cooperate with an RFID reader 208 to transmit/receive data to/from each of the RFID tags present in the reading box 204.

The system 200 also comprises detectors 210 of the presence of at least one object placed in the reading box and weighing means such as a balance 212. It is the presence detectors 210 which directly or indirectly initiate the reading of RFID tags located on the objects deposited in the reading box 204.

The system 200 also comprises a central computing device 214 carrying out the management of all of the operations. This computing device 214 is described in more detail below.

The system 200 also comprises a portal for detection 216 of unread tags. The detection portal comprises two antennas 218 arranged on the ground or in a standard double "totem" arrangement and provided to interrogate each of the tags passing through the portal 216. These antennas 218 also cooperate with a reader 217. The antennas 218 and the reader 217 form means for interrogation of the tags as well as means, denoted second reading means, for reading their content.

The system 200 also comprises visual and/or sound signalling means 220, such as a visual/sound alarm, which are activated when an unread RFID tag is detected by the portal 216.

The system 200 also comprises at least one display screen 222 and at least one means for automated payment means 224, for example by bank card and printing means for example a printer 226.

The system 200 comprises wireless communication means, for example means 228 for communication by WIFI as well as means for connection to an Internet-type network 230. Such means allow communication between the different entities of the system, in particular the management device 214, the reading box 204 and the portal 216.

Figure 3:
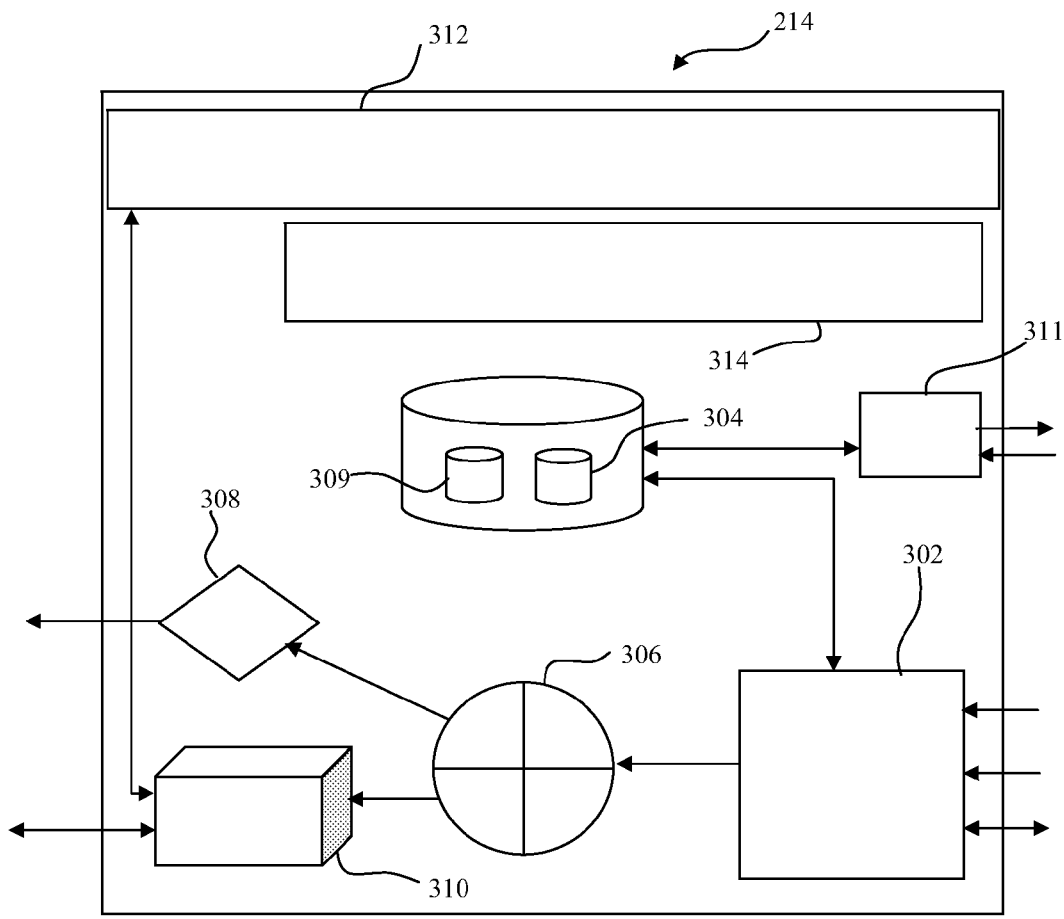
FIG. 3 is a diagrammatic representation of a computing device utilized in the system of FIG. 2.

FIG. 3 is a diagrammatic representation of the non-exhaustive content of the computing device 214.

It should be noted that the device 214 can be integral with the reading box 204, or with the detection portal 216 or be remote from these two entities. It can in any case communicate with these two entities, i.e. transmit data in the direction of these entities and receive data originating from these entities, for example using means of communication such as 228 or 230.

The device 214 comprises a management module 302.

This management module 302 receives data from the presence sensors 210 of the reading box 204 and sends a reading request to the RFID reader 208 which launches a reading operation (or first reading step).

This management module 302 then receives identification data from the RFID reader 208. For each new item of identification data received by the reception module 302, the reception module 302 consults a database 304 in order to access price and description data for the object with which the identifier is associated.

The price data are transmitted to a calculation module 306 which determines the total price for all of the objects present in the reading box 204. The total price is sent to a display module 308 which processes the data and displays them on the display screen 222.

The price data are also sent to a payment module 310 which carries out the automated payment, using the payment terminal 224, by bank card and optionally at an interface 312 connection to an internet-type network.

When the payment is carried out, the management module 302 transmits a request to the RFID reader 208 to functionally deactivate all the RFID tags from which the identification data have been read within the context of the last reading operation. Each RFID tag is deactivated by sending it a self-destruction "kill" request.

The read identification data are also stored in another database 309, denoted authorized tag database, listing the tags paid for.

This management module 302 also receives data from the balance 212 for operations of verification of the nature of the objects according to the total weight of the objects deposited in the reading box 204 and the weight associated with each of these objects in the database 304.

The device 214 also comprises a comparison module 311.

This module is capable of receiving the data read by the reader 217 of the portal 216, comparing the data read and transmitted by the reader 217 and the data in the authorized tag database 309, which it is capable of accessing. If it finds no correspondence between these data, it determines that the data have not been read and issues a command to activate the signalling means 220.

In the opposite case, it could be envisaged that it returns a message to the reader 217 providing evidence that the object has been paid for, and giving the latter the instruction to functionally deactivate the tag. In this case, the portal, for example the second reading means, comprises means for functionally deactivating the tag. The module can also delete the line corresponding to the tag or tag group from the database 309.

The computing device 214 also comprises a WIFI communication interface 314.

It should be noted that all of the means 202, 302, and optionally, 210, 212, 224, 226, 306, 308 form a management device according to the invention. The detection device according to the invention is constituted by the means 216, 218, 310 as a minimum.

Of course the invention is not limited to the examples which have just been described.

For example, the deactivation of the tags can be carried out by entering an item of data in a flag of the RFID chip or by changing the value of a BIT of the latter.

In one of these cases, the detection portal can initially read an item of data for the deactivation of each of the tags in the predetermined zone. If this item of deactivation data indicates that the tag has not been deactivated, it can read an item of identification data of the tag and activate the comparison module.

In all cases, the comparison step and the comparison module are optional. They can also be replaced by other means. For example, instead of creating a database 309, distinct from the database 304, it is possible to modify the value of an item of data, so-called payment data, associated with an item of identification data of a tag in the database 304 when the tag has been read by the first reading means and paid for. In this case, the determination operation will correspond to reading in the database 304 the value of the item of payment data associated with the item of identification data read by the second reading means.

The comparison module can be placed in a different location than in the management device, for example in the detection portal 216, in association with the reader 217.

The means of displaying the price or weight of the objects situated at the reading site, and the corresponding means, are also optional. Other steps or means can also be included in the method or the system.

The invention claimed is:

1. An automated method for managing objects each provided with a radio frequency identifier (RFID) tag comprising at least one item of identification data associated with said object, said method comprising the following steps performed by a computing device:
   a step of reading, using an RFID reader, at least one item of identification data stored in at least one RFID tag arranged on at least one object positioned at a reading site;
   a step of deactivation, using the computing device, of at least one RFID tag the item of identification data of which has been read so that it is not detected during a fraud detection step;
   a step of calculation, using the computing device, of an item of data relating to all of the tags read by the RFID reader; and
   a step of automated payment, using the computing device, according to said item of data relating to all of the tags read by the RFID reader,
   wherein the deactivation step and the calculation step are carried out after the same single reading step using the at least one item of identification data.

2. The method according to claim 1, further comprising a step of detection of the presence of at least one object at the reading site.

3. The method according to claim 1, wherein the deactivation of at least one RFID tag is a functional deactivation.

4. The method according to claim 1, further comprising a step of detection of at least one RFID tag the item of identification data of which has not been read.

5. The method according to claim 4, wherein the detection of at least one RFID tag the item of identification data of which has not been read comprises:
   a step of interrogation of RFID tags and a step of detection of the emission of data by an active RFID tag following the interrogation, or
   a step of reading an item of data of the tag relating to deactivation.

6. The method according to claim 4, wherein the reading step is a first reading step, the detection comprises:
   a second step of reading at least one item of identification data of the active RFID tag, and
   a step for determining whether the tag has been read during the first reading step, according to data relating to the tags, previously stored, in particular following the first reading step.

7. The method according to claim 6, wherein the detection step, in particular the determination step, comprises a comparison of an item of identification data of the active RFID tag with identification data previously read during the first reading step, said method comprising a step of storage of the identification data read during the first reading step.

8. The method according to claim 4, further comprising a step of activating a notice function when an unread RFID tag is detected.

9. The method according to claim 1, further comprising a step of, for at least one item of identification data read during the first reading step, consulting at least one item of data associated with said item of identification data stored in a database.

10. The method according to claim 1, further comprising a step of implementing for the automated payment for coffee capsules provided with RFID tags.

11. A computing device for the automated management of objects each provided with a radio frequency identifier (RFID) tag comprising an item of identification data associated with said object, said computing device comprising:
   a first RFID reader, for reading at least one item of identification data stored in at least one RFID tag arranged on at least one object positioned at a reading site;
   means arranged for deactivating at least one RFID tag the item of identification data of which has been read;
   means for determining at least one item of data relating to all of the tags read by the first RFID reader; and
   automated payment means,
   wherein the deactivating means and determining means are executed after the same single reading performed by the first RFID reader using the at least one item of identification data.

12. The device according to claim 11, further comprising means for detecting the presence of at least one object at a predetermined reading site.

13. The device according to claim 11, further comprising means for consulting, in a database, at least one item of data associated with at least one read item of identification data.

14. The device according to claim 11, further comprising means for utilizing the automated payment of object provided with RFID tags.

15. The method according to claim 3, wherein the functional deactivation is performed by sending a kill type request to the at least one RFID tag.

16. The method according to claim 3, wherein the functional deactivation is performed by allocating a bit in the at least one RFID tag.

17. The method according to claim 3, wherein the functional deactivation is performed by writing an item of data in a flag in the at least one RFID tag.

* * * * *